(12) United States Patent
Bulger et al.

(10) Patent No.: US 11,851,543 B2
(45) Date of Patent: Dec. 26, 2023

(54) HIGH OPTICAL TRANSPARENCY POLYMER AEROGELS USING LOW REFRACTIVE INDEX MONOMERS

(71) Applicant: PALO ALTO RESEARCH CENTER INCORPORATED, Palo Alto, CA (US)

(72) Inventors: Eli Bulger, Nottawa (CA); Mahati Chintapalli, Mountain View, CA (US); Gabriel Iftime, Dublin, CA (US); Quentin Van Overmeere, Mountain View, CA (US); Jessica Louis Baker Rivest, Palo Alto, CA (US); Ravi Neelakantan, Redwood City, CA (US); Stephen Meckler, Redwood City, CA (US)

(73) Assignee: XEROX CORPORATION, Norwalk, CT (US)

( * ) Notice: Subject to any disclaimer, the term of this patent is extended or adjusted under 35 U.S.C. 154(b) by 274 days.

(21) Appl. No.: 17/245,418

(22) Filed: Apr. 30, 2021

(65) Prior Publication Data
US 2021/0309822 A1    Oct. 7, 2021

Related U.S. Application Data

(62) Division of application No. 16/228,472, filed on Dec. 20, 2018, now Pat. No. 10,995,191.

(51) Int. Cl.
*C08J 9/00* (2006.01)
*C08J 9/28* (2006.01)
(Continued)

(52) U.S. Cl.
CPC ............. *C08J 9/0004* (2013.01); *C08J 3/242* (2013.01); *C08J 9/286* (2013.01);
(Continued)

(58) Field of Classification Search
CPC .................... C08J 2205/026; B32B 2266/126
See application file for complete search history.

(56) References Cited

U.S. PATENT DOCUMENTS 5,723,554 A    3/1998  Fujita et al.
5,795,557 A    8/1998  Pajonk et al.
(Continued)

FOREIGN PATENT DOCUMENTS

WO      9946310 A1     9/1999
WO   2010080238 A3     7/2010

OTHER PUBLICATIONS

Henkel et al. The Influence of RAFT on the Microstructure and the Mechanical Properties of Photopolymerized Poly(butyl acrylate) Networks. Macromol. Chem. Phys., 215: 182-189. (Year: 2013).*
(Continued)

*Primary Examiner* — Michael M Dollinger
(74) *Attorney, Agent, or Firm* — Miller Nash LLP (57) ABSTRACT

A method of producing a polymer aerogel includes dissolving precursors into a solvent, wherein the precursors include monomers, crosslinkers, a controlling agent and an initiator to form a precursor solution, wherein at least one of the monomers or at least one of the crosslinkers has a refractive index of 1.5 or lower, polymerizing the precursor solution to form a gel polymer, and removing the solvent from the gel polymer to produce the polymer aerogel. A method of producing a polymer aerogel include dissolving precursors into a solvent, wherein the precursors include monomers, crosslinkers, a controlling agent and an initiator to form a precursor solution, polymerizing the precursor solution to form a gel polymer, removing the solvent from the gel polymer to produce the polymer aerogel, and reducing a refractive index of one of either the gel polymer or the polymer aerogel.

17 Claims, 4 Drawing Sheets

(51) Int. Cl.
*C08J 3/24* (2006.01)
*C08K 5/00* (2006.01)

(52) U.S. Cl.
CPC .... *C08J 2205/026* (2013.01); *C08J 2205/044* (2013.01); *C08K 5/0025* (2013.01)

(56) References Cited

U.S. PATENT DOCUMENTS

| | | | |
|---|---|---|---|
| 6,713,584 | B1 | 3/2004 | Chisholm et al. |
| 7,732,496 | B1 | 6/2010 | Leventis |
| 8,663,742 | B2 | 3/2014 | Kissel |
| 10,995,191 | B2 * | 5/2021 | Bulger .................. G02B 1/041 |
| 2003/0013822 | A1 | 1/2003 | Chisholm et al. |
| 2004/0063880 | A1 | 4/2004 | Chisholm et al. |
| 2010/0163157 | A1 | 7/2010 | Mulburn |
| 2011/0237692 | A1 | 9/2011 | Wu et al. |
| 2011/0311802 | A1 | 12/2011 | Cho |
| 2014/0065329 | A1 | 3/2014 | Showers |
| 2014/0080934 | A1 | 3/2014 | Wu et al. |
| 2015/0203650 | A1 | 7/2015 | Kolb et al. |
| 2018/0093456 | A1 | 4/2018 | Van Overmeere et al. |
| 2018/0237608 | A1 | 8/2018 | Hess et al. |
| 2019/0106543 | A1 | 4/2019 | Chintapalli et al. |
| 2020/0199319 | A1 | 6/2020 | Bulger et al. |

OTHER PUBLICATIONS

Zhang, et al. Polymer Nanofibers with Outstanding Thermal Conductivity and Thermal Stability: Fundamental Linkage Between Molecular Characteristics and Macroscopic Thermal Properties, Journal of Physical Chemistry C 2014 118:36, pp. 21148-21159.
Jenkins et a. "Terminology for reversible-deactivation radical polymerization previously called 'controlled' radical or living radical polymerization (IUPAC Recommendations 2010," Pure Applied Chemistry, vol. 82, No. 2, pp. 483-491, 2010.
Belmares et al., "Hildebrand and Hansen Solubility Parameters from Molecular Dynamics with Applications to Electronic Nose Polymer Sensor Polymers," Wiley Periodicals 2004.
Graeme Mood et al., "A Micro Review of Reversible Addition/Fragmentation Chain Transfer (RAFT) Polymerization," Sigma-Aldrich, 8 pages.
Sebastien Perrier, "50th Anniversary Perspective: RAFT Polymerization—A User Guide," Macromolecules 2017, 50, pp. 7433-7447.
Vivek Mishra, "Living Radical Polymerization—A Review," Journal of Scientific Research, vol. 56, 2012 pp. 141-176.
Andrew Shinko, "Structure and Morphology Control in Polymer Aerogels with Low Crosslink Density," A Dissertation, Jan. 1, 2015, 238 pages.
Niskanen et al., J. of Quantitative Spectroscopy & Radiative Transfer, 235 (2019) 1-6.
Butyl Acrylate Technical Data Sheet from BASF (2003).

* cited by examiner

HIGH OPTICAL TRANSPARENCY POLYMER AEROGELS USING LOW REFRACTIVE INDEX MONOMERS

CROSS REFERENCE TO RELATED APPLICATION

This application is a divisional of, and claims priority to, U.S. patent application Ser. No. 16/228,472, filed Dec. 20, 2018, which is incorporated herein by reference in its entirety.

STATEMENT REGARDING FEDERALLY SPONSORED RESEARCH AND DEVELOPMENT

This invention was made with Government support under contract DE-AR000074 awarded by ARPA-E, Department of Energy. The Government has certain rights in this invention.

TECHNICAL FIELD

This disclosure relates to polymer aerogels, more particularly to high optical transparency aerogels.

BACKGROUND

Porous, transparent aerogels have promise as materials for low cost thermal barriers in windows. Polymer-based aerogels have advantages over other types of aerogels due to the wide range of properties accessible due to the myriad of monomer and crosslinker building blocks available, and the different polymerization methods. One can design porous polymer aerogels to possess high pore volume, high specific surface area, small pore size, high mechanical strength, good chemical stability, and tunable hydrophobicity. These morphological and chemical characteristics define the efficacy of the aerogel in its application.

Various methods can be used to synthesize polymer aerogels including condensation or radical polymerization. Radical polymerization offers compatibility with a wide range of monomers and crosslinkers in conjunction with established techniques to control the final properties of synthesized polymers. Controlled radical polymerizations in particular benefit the development of polymer aerogels because these methods can control the pore size distribution of the aerogels. Examples of controlled radical polymerization methods include using chain transfer agents (CTA), polymerization mediated by stable free radicals (SFRP), atom transfer radical polymerization (ATRP), radical addition fragmentation transfer (RAFT), and other controlled polymerization methods. Polymer gels formed by uncontrolled or controlled polymerization may undergo freeze drying, supercritical or evaporative drying, where they may also be known as xerogels due to dramatic loss of their porosity.

Polymer aerogels used in thermal management applications, such as thermal barriers, benefit from high pore volume and small pore size. High porosity and small pore size result in decreased thermal conductivity by reducing density, reducing the conductivity of the pore-filling gas through the Knudsen effect, and increasing phonon scattering. Mechanical strength, chemical stability, and tunable surface energies also play an important role in the applications of porous polymer aerogels.

However, fundamental difficulties exist in achieving high optical transparency and low haze in porous materials. The large pore volumes of highly porous aerogels derive from macropores (greater than 50 nm) and mesopores (2-50 nm) of larger pore widths. These large pore sizes scatter light due to Rayleigh scattering and/or Mie scattering. Theoretically, one can avoid large pore sizes at high porosities by increasing the number of small mesopores and micropores (<2 nm), but practically generating, and maintaining, this morphology during synthesis and post-synthesis processing of aerogels has many challenges. Small pores collapse when drying under ambient conditions, preventing the abundance of small pores typically necessary to achieve the combination of high porosity and high optical transparency.

One approach to making high transparency insulation materials is to use silica aerogels. A sol-gel method produces these aerogels using hydrolysis of sol-gel precursors, polycondensation, and aging, to form an inorganic gel that then undergoes drying. Silica aerogels can exhibit high porosity and high optical transparency when dried in supercritical conditions. However, supercritical drying requires specialized equipment not scalable for practical applications, has high cost and consumes a lot of time. Supercritical $CO_2$ drying typically begins with a solvated gel that undergoes a solvent exchange into liquid $CO_2$ and then undergoes high temperatures and high pressures for several hours. Supercritical $CO_2$ drying maintains the pore size of aerogels by eliminating the surface tension from the evaporating liquid phase, reducing the collapse of pore walls and allowing smaller pores to maintain their presence. However, these aerogels are mechanically fragile and hydrophilic, requiring post-processing to make them stable at ambient humidity.

Porous polymer aerogels overcome some of the inherent limitations of silica aerogels by allowing greater mechanical strength and fine tuning of morphological and chemical characteristics. Polymer aerogels having high porosity generally consist of rigid monomers and crosslinkers that result in reduced pore shrinkage upon drying. One can synthesize polymer aerogels with high porosities (>90%), but they often contain macropores and larger mesopores, resulting in excessive light scattering and little to no optical transparency. Polymer aerogels with high optical transparency and low light scattering usually primarily contain micropores and small mesopores, which afford relatively low maximum porosities (10-40%) when drying under ambient conditions. A process that can intrinsically reduce either the pore shrinkage or light scattering would be desirable.

SUMMARY

According to aspects illustrated here, there is provided a method of producing a polymer aerogel that includes dissolving precursors into a solvent, wherein the precursors include monomers, crosslinkers, a controlling agent and an initiator to form a precursor solution, wherein at least one of the monomers or at least one of the crosslinkers has a refractive index of 1.5 or lower, polymerizing the precursor solution to form a gel polymer, and removing the solvent from the gel polymer to produce the polymer aerogel.

According to aspects illustrated here, there is provided a method of producing a polymer aerogel that includes dissolving precursors into a solvent, wherein the precursors include monomers, crosslinkers, a controlling agent and an initiator to form a precursor solution, polymerizing the precursor solution to form a gel polymer, removing the solvent from the gel polymer to produce the polymer aerogel, and reducing a refractive index of one of either the gel polymer or the polymer aerogel.

DETAILED DESCRIPTION OF THE EMBODIMENTS

The embodiments here use low refractive index precursors to produce aerogels with lower haze and higher optical transparencies at higher porosities and pore sizes when compared to their higher refractive index counterparts. The embodiments may produce aerogels that exhibit decreased thermal conductivities, having benefits for applications in transparent thermal barriers.

As used here, the term 'high optical transparency' means that the aerogels have a visible transmittance of 20%/3 mm or higher. The term 'low haze' means an aerogel having haze lower than 50%/3 mm. Further, the term 'rigid' means a monomer and/or crosslinkers having a stiffness of at least 3.5 GigaPascals (GPa) when polymerized as a bulk homopolymer. The term 'highly porous' means an aerogel having a porosity of over 10%.

Figure 1:
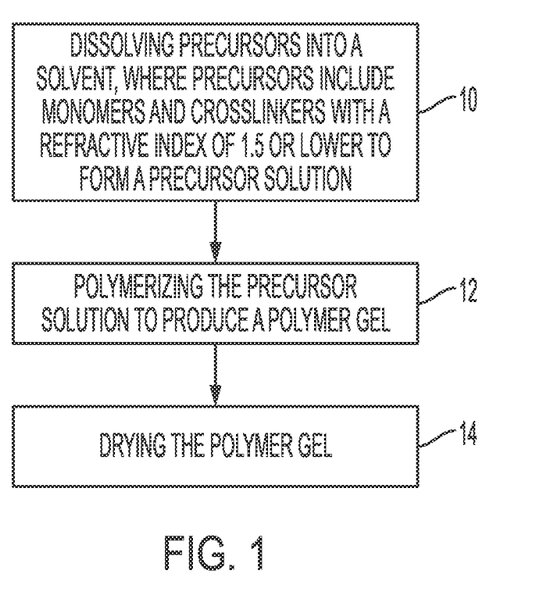
FIG. 1 shows a flowchart of an embodiment of a method to manufacture a high porosity optically transparent, low haze polymer aerogel.

FIG. 1 shows an embodiment of a process to manufacture porous, polymer aerogel having high optical transparency and low haze. At 10, precursors are dissolved into a solvent, where the precursors include at least one monomer or crosslinker having a refractive index of 1.5 or lower, 1.45 or lower, or 1.4 or lower. The term 'crosslinker' here may include monomers that have the capability of crosslinking with other monomers during polymerization.

Monomers and/or crosslinkers with low refractive index can be incorporated or substituted in a polymer aerogel formulation to reduce haze and increase transparency. The low refractive index precursors create new transparent porous polymer aerogels or increase transparency of porous polymer aerogels typically synthesized from their high refractive index counterparts. Low refractive index precursors allow increased transparency at larger average pore dimensions, such as those greater than 30 nanometers, compared to higher refractive index monomers that allow transparency only at smaller pore dimensions, such as below 30 nanometers. Low refractive index precursors also allow greater tolerance for low concentration, larger size defects such as pores >50 nm or polymer clusters. Achieving transparency at higher pore dimensions allows higher porosity in transparent aerogels, which has benefits for reducing thermal conductivity in window thermal barrier applications.

Mono or di-functional monomers and/or multifunctional crosslinkers used to synthesize porous polymer aerogels with enhanced transparency are chosen based on the bulk refractive index of the corresponding dense homopolymers. Low refractive index monomers and/or crosslinkers leading to transparent porous polymer aerogels are typically fluorinated, and/or contain chemical groups with low polarizability or low dielectric constant. Lower refractive indices of monomers and their corresponding polymers result from lower polarizability arising from chemical bonds not prone to interactions with oscillating electric or electromagnetic fields, such as light in the visible frequency range. By using low refractive index polymer precursors, optical transparency is increased and haze is reduced because scattering phenomena such as Rayleigh scattering decrease when the difference in refractive index between the polymer network and the substance in the pores is reduced. In window applications, the substance in the pores is a gas such as air, nitrogen, argon, or krypton, at 1 atmosphere of pressure or below, (vacuum). Such gases and vacuum have refractive indexes below 1.001, whereas polymers have refractive indexes above 1.001, typically above 1.3. Thus, reducing the refractive index of the polymer reduces light scattering.

Monomers can be monofunctional at a content of less than 50% by volume, with respect to the total amount of polymerizable precursors, in a copolymerization scheme to create porous aerogels. Di-functional and multifunctional monomers and/or crosslinkers can create porous and transparent polymer aerogels at contents of 50-100 vol % of the polymerizable precursors. Monofunctional means have one group capable of participating in a polymerization or crosslinking reaction. Di- or multifunctional mean having two or multiple such groups, respectively. Examples of low polarizability monomers used to create porous and transparent polymer aerogels include, but are not limited to, 1H, 1H, 6H, 6H-Perfluoro-1,6-hexanediol diacrylate (F-HDDA), 2, 3, 4, 5,6-pentafluorostyrene, 1H, 1H, 2H-Perfluoro-1-hexene, ethylene glycol diacrylate, methacrylate-functionalized perfluoropolyethers, and acrylate-functionalized perfluoropolyethers. The diagrams below show molecular structure of the examples of low refractive index monomers and/or crosslinkers. These make up from 0.1-100 vol % of the polymerizable precursors, more specifically 0.1-20 vol %.

As shown above, the molecules from left to right are: 1H, 1H, 6H, 6H-Perfluoro-1,6-hexanediol diacrylate (F-HDDA), 2, 3, 4, 5,6-pentafluorostyrene, 1H, 1H, 2H-Perfluoro-1-hexene, and ethylene glycol diacrylate. Other examples of low refractive index monomers include 1,1,1,3,3,3-Hexafluoroisopropyl methacrylate, 2,2,2-Trifluoroethyl methacrylate, 1,1,1,3,3,3-Hexafluoroisopropyl acrylate, 2,2,2-Trifluoroethyl acrylate, methacrylate-functionalized perfluoropolyethers, and acrylate-functionalized perfluoropolyethers. Table 1 shows examples of refractive indexes of selected polymers corresponding to common monomers and/or crosslinkers. Low refractive index monomers with refractive index below 1.5, 1.45, or 1.4 make up 0.1-70 vol % of the polymerizable precursors.

| Polymer | Refractive Index |
| --- | --- |
| Poly(hexafluoropropylene oxide) | 1.3010 |
| Poly(tetrafluoroethylene) | 1.3500 |
| Poly(ethylene oxide) | 1.4539 |
| Poly(4-fluoro-2-trifuloromethylstyrene) | 1.4600 |
| Polystyrene | 1.5894 |
| Poly(p-divinylbenzene) | 1.6150 |

Porous polymer aerogels synthesized from low refractive index precursors may be combined with rigid monomers, where, as mentioned before, a rigid or stiff monomer has a stiffness of over 3.5 GPa when polymerized as a bulk homopolymer. The combination increases porosity and decreases shrinkage upon drying. Rigidity may also be evaluated by comparing glass transition temperatures of polymers corresponding to the monomers and/or crosslinkers used. Rigid monomers and/or crosslinkers often have higher refractive indexes, so incorporation of low refractive index precursors serves to decrease haze and increase optical transparency in these materials. Examples of common monomers and crosslinkers that can be combined with low refractive index precursors are shown below. These make up 30-99.9 vol % of the polymerizable precursors.

a)

b)

c)

d)

The examples of rigid monomers and crosslinkers shown above include divinylbenzene (DVB), hexanediol diacrylate (HDDA), hexanediol dimethacrylate, trimethacrylate adamantane, octamethacryl POSS, and dipentaerythritol pentacrylate, but are not limited to these examples. The addition of rigid monomers and/or crosslinkers to the precursor solution is an optional process. Some monomers and crosslinkers may possess low refractive index and high rigidity simultaneously. Such monomers and crosslinkers may make up 0-100 vol % of the polymerizable precursors.

Returning to FIG. 1, after the formation of the precursor solution, the solution undergoes polymerization at 12. One should note that the polymerization results in polymers that consist of the monomers and crosslinkers that have the characteristics discussed above. Conventional or controlled radical (co)polymerizations may be used to synthesize the porous and transparent polymer aerogels. This may include the use of a chain transfer agent, or processes such as radical addition fragment transfer (RAFT) polymerization, atom transfer radical polymerization (ATRP), or stable free radical polymerization (SFRP), as examples. Tuning the rate of release of radicals by the initiator, such as a thermal initiator, can control the radical polymerization. The use of good solvents can also, in part, control the radical polymerization. A solvent is defined as "good" if the Flory Huggins interaction parameter between the solvent and polymer is below 0.5, or if the difference in the Hildebrand or Hansen solubility parameters between the solvent and polymer is small. Controlling the polymerization controls the pore size distribution of polymer aerogels, which determines the porosity, optical transparency, and haze of the resulting aerogel.

After polymerization at 12, the polymer gel dries at 14. Drying may involve ambient drying, freeze drying, or supercritical $CO_2$ drying. Prior to drying the gel, it may undergo solvent exchange or the sols can undergo direct exchange.

EXAMPLE

Gel precursors were dissolved in a high boiling point organic solvent such n-methylpyrrolidone, dimethylsulfoxide, 1,2-dichlorobenzene, xylenes, or dimethylformamide, and degassed with dry $N_2$. A typical gel precursor mixture consists of radical initiator, monomer(s) and/or crosslinker(s), and chain transfer agent or another controlling agent. Azobisisobutyronitrile (AIBN) is a thermal initiator typically used, but the initiator may also consist of lauroyl peroxide, benzoyl peroxide, tert-butyl peroxide, dicumyl peroxide, a photoinitiator, benzophenone, anthaquinone, camphorquinone, and benzoin. Initiators make up 0.001-10 wt % of the precursor solution, which includes polymerizable precursors and solvent.

The precursor solution may also include a control agent consisting of at least one of: a chain transfer agent, such as organic thiols, a chain transfer agent capable of mediating a RAFT polymerization process, trithiocarbonate chain transfer agent, a xanthate chain transfer agent, a benzodithioate chain transfer agent, dodecanethiol, chloroform, octyl mercaptan, or 1,8-dimercapto-3,6-dioxaoctane, a nitroxide radical such as 2,2,6,6-Tetramethyl-1-piperidinyloxy (TEMPO), 4-hydroxy-TEMPO, or a nitroxide derived from decomposition of an alkoxyamine, or a ligand-coordinated transition metal ion capable of mediating an ATRP polymerization. The control agent or agents may each make up 0.0001-10 wt % of the precursor solution.

Monomer(s) and/or crosslinker(s) generally consist of a combination of rigid monomer such as divinylbenzene, trimethacryl adamantane, or dipentaerythritol pentaacrylate, and low refractive index monomer such as 1H,1H,6H,6H-Perfluoro-1,6-hexanediol diacrylate. The composition of polymerizable material vs solvent ranges from 0.1% to 70% by volume. The degassed solution was cast into a mold and polymerized in an oven at 90° C. for approximately 1-2 hours, but could be heated in the range of 50 to 150° C. for a period of time of at least 1 minute. Polymerization could also occur due to exposure to visible or UV radiation, or more generally electromagnetic radiation, at room temperature, 20° C., or above.

The gels were removed from the mold and solvent exchanged before subsequent drying steps. Gels were first solvent exchanged into a good solvent, such as tetrahydrofuran, n-methylpyrrolidone, benzene, or dimethylformamide, to extract any oligomers, and then exchanged into a solvent with low solvent-polymer interaction strength, or 'bad solvent' such as acetone or heptane, before drying. Static or flow solvent exchange can be used. In static solvent exchange, 2 g of wet gel were placed in 10 mL of solvent for 1 day. Two exchanges were performed for each type of solvent. Alternatively, gels can be exchanged directly into a low surface tension solvent such as acetone with as little as one solvent exchange. Gels can also be dried without undergoing solvent exchange. Resultant aerogels using this method typically have smaller pore sizes and porosities.

Aerogels were produced by drying the solvent exchanged gels. Either ambient or supercritical $CO_2$ drying can be used. In ambient drying, a gel immersed in a non-solvent such as heptane or low surface tension solvent such as acetone was slowly dried over 2-3 days in a covered container, and then dried under vacuum at elevated temperature, 50° C. In supercritical $CO_2$ drying, gels in a solvent such as acetone or an alcohol are solvent exchanged with liquid $CO_2$ and supercritically dried. Higher porosity and larger pore sizes are generally achieved with supercritical $CO_2$ drying.

Figure 2:
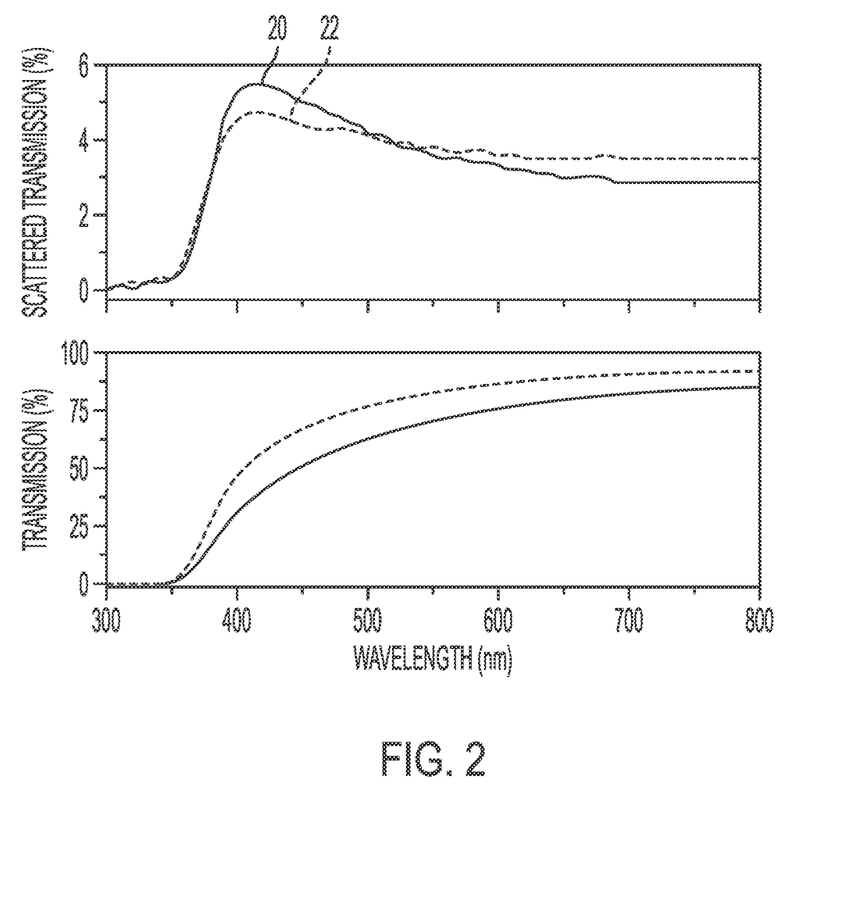
FIG. 2 shows a graph of optical transmission and scattering spectra of aerogel and corresponding low refractive index aerogel.

Optical transmission and scattering measurements with a spectrophotometer can be performed on the transparent porous aerogels to quantitatively determine the optical transmission and scattered transmission. From these measurements, visible light transmittance and haze values can be reported as metrics for evaluating the transparency of the porous polymer aerogels. An example of transmitted and scattered light in the visible region by porous polymer aerogels with higher refractive index (DVB/HDDA) at curve 20 and lower refractive index (DVB/F-HDDA) at curve 22 with similar porosities and pore sizes is shown in FIG. 2, where the low refractive index aerogel shows higher visible light transmittance and lower visible light scattering.

In addition to optical measurements, Brunauer Emmett Teller (BET) specific surface areas (SSAs) can be measured by $N_2$ adsorption porosimetry. Higher surface areas typically imply smaller pore sizes at equivalent pore volumes, a higher number of smaller pores, larger pore volumes at equivalent pore size, more pores of same size, or a combination of these. BET SSAs are a good metric for determining the overall porosity and/or pore size of porous polymer aerogels. The cumulative pore volume (CPV) and pore size distribution of the material can also be determined. The use of low refractive index monomers and/or crosslinkers to synthesize porous polymer aerogels or the incorporation and/or substitution of these components into an existing precursor composition can affect the morphology of the resultant polymer aerogels. Typically, when a monomer or crosslinker with lower refractive index, such as by fluorination to introduce C—F bonding, substitutes an analogous monomer or crosslinker with C—H bonds and higher refractive index, SSAs are maintained, optical transparency increases, and haze decreases. Table 2 shows an example of the substitution of a higher polarizability monomer (HDDA) with an analogous lower polarizability monomer (F-HDDA) with similar SSAs.

| DVB Content (vol %) | Acrylate Content (vol %) | Optical Transmission (%/3 mm) | Haze (%/3 mm) | Porosity by CPV (%) | BET SSA (m²/g) |
|---|---|---|---|---|---|
| 60 | 40 (HDDA) | 32.0 | 7.4 | 25 | 329 |
| 60 | 40 (F-HDDA) | 39.6 | 5.5 | 23 | 386 |

Compared to the polymer aerogel composed solely of high refractive index monomers and/or crosslinkers, specific surface area and CPV are approximately the same, however haze is significantly lower, by 25%. When dried supercritically, low refractive index polymer aerogels can show high porosities (>50%) with relatively low haze (<30%) compared to higher refractive index aerogels. Controlled polymerizations can give medium to high porosities (>40%) with high SSAs (>600 m²/g) and low haze (<15%/3 mm) under ambient drying conditions.

Figure 3:
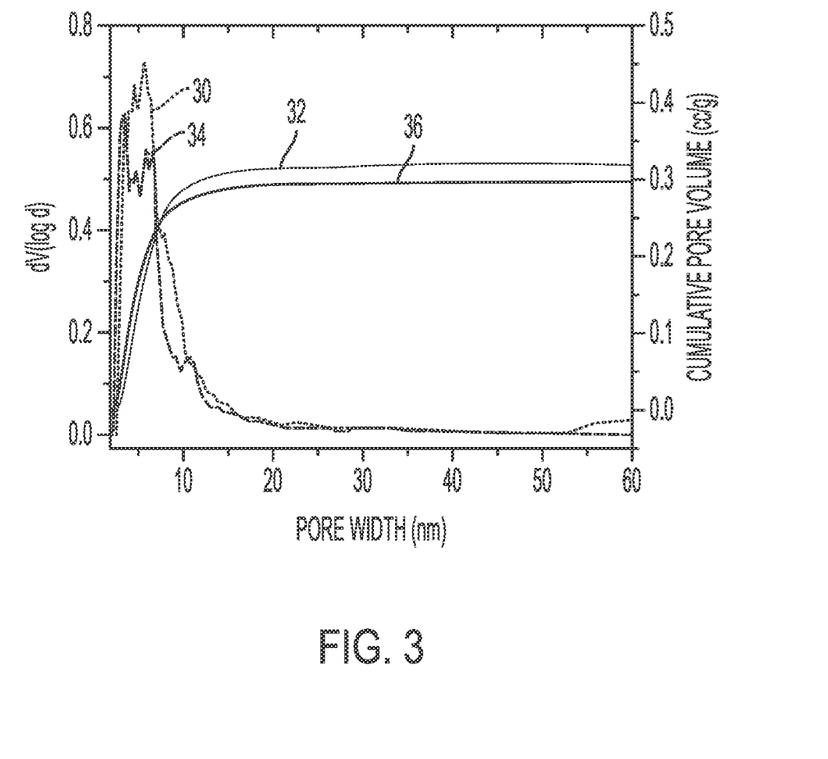
FIG. 3 shows a graph of comparison of pore volumes and pore size distributions of transparent porous polymer aerogels.

Pore volumes of porous polymer aerogels can be estimated by multiple methods. The first method involves finding densities of polymer aerogels by dividing their masses by their volumes, which are then divided by bulk densities of respective polymers to calculate pore volume fractions. Another method used to measure pore volume is $N_2$ adsorption porosimetry. These methods are typically consistent with one another when bulk polymer density is known, and both serve as good metrics for comparing pore volume in porous polymer aerogels. A comparison of the pore size distributions and pore volumes (by $N_2$ porosimetry) of a porous polymer aerogel (DVB/HDDA) and its low refractive index counterpart (DVB/F-HDDA) is shown in FIG. 3. Curve 30 shows the pore size and curve 32 shows the pore volume for DVB/HDDA, and curve 34 shows the pore size and curve 36 shows the pore volume for DVB/F-HDDA. The two aerogels have similar pore size distributions and pore volumes. The aerogel incorporating low refractive index precursors has lower haze, <6%/3 mm. FIG. 3 illustrates that the embodiments herein enable synthesis of porous polymer aerogels with haze <6%/3 mm, specific surface area >300 m²/g, a porosity >20%, average pore size <10 nm, and pore size distribution with full width at half maximum below 10 nm. These are differentiating characteristics of the aerogel with low refractive index in FIG. 3.

In another embodiment, the refractive index of the polymer network may be reduced after the polymerization step. This can be accomplished by increasing the number of C—F bonds relative to the C—C and/or C—H bonds in the material. The addition of C—F bonds may be accomplished by adding F atoms directly to the polymer structure, substituting F atoms for other atoms such as H, or by adding molecules containing F. The addition of C—F bonds can be performed in a solvent, by polymerizing the gel in a medium containing components for the post-functionalization reaction, or by polymerizing the gel and solvent exchanging into a medium containing the components for the post-functionalization. The addition of C—F bonds can also be performed after the aerogel has been dried. No order of performing fluorination should be implied as it can occur at any point in the process between polymerization and finalizing the aerogel. Fluorination reactions that can be used are: direct fluorination by $F_2$, HF, or $XeF_2$, or electrophilic aromatic substitution (EAS). In one embodiment of the EAS reaction, fluorine is added to an aromatic group in the polymer network by using a Lewis acid catalyst such as $FeCl_3$, $SnCl_4$, $AlCl_3$, or $BF_4$—adducts in conjunction with a fluorinated molecule containing a leaving group such as Cl, Br, I. In another embodiment of the EAS reaction, fluorine is added by using ionic compounds derived from 1,4-diazabicyclo[2.2.2]octane, such as 1-(chloromethyl)-4-fluoro-1,4-diazoniabicyclo[2.2.2]octane, with counterions such as $BF_4$, $FSO_3$, triflate, and $PF_6$. The ionic compound is used either by itself or in conjunction with a superacid such as triflic acid or triflimidic acid. The polymer gel or aerogel may be pretreated to enhance or enable reaction with the fluorinating reagent or fluorine-containing group.

This embodiment would involve similar processes to the method disclosed above, except for the contents of the precursor solution would not have low refractive index monomers and crosslinkers, and there would be a process of decreasing the refractive index of the gel after polymerization. This embodiment could also be performed on gels already containing low refractive index monomers, to further reduce the refractive index.

Similar to fluorination, in another embodiment, the amount of siloxane relative to hydrocarbon content can be increased through post-polymerization modification to reduce refractive index. Siloxane groups comprise repeat units of alternating Si and O bonds, where the Si atoms also form bonds with methyl, hydrogen, or hydrocarbon groups. The general structure is X—[—(SiR$_1$R$_2$)—O—]$_n$ where R$_1$ and R$_2$ are methyl, hydrogen, or hydrocarbon groups not bonded to the O atoms in the backbone. The siloxane groups include another reactive functional group, X, such as alkoxysilane, a halide, hydroxide, amine, epoxide, thiol, vinyl, or carboxylic acid to enable its incorporation into the polymer gel or aerogel. The polymer gel or aerogel may be pretreated, for example by undergoing oxidation by UV, exposure to a chemical oxidizing agent, or plasma treatment, to enable reaction with the siloxane group. The siloxane may be reacted with a solvated gel by introducing the reagents through the polymerization solvent or performing one or more solvent exchanges into a medium containing the reagents. The siloxane may be reacted with a dried aerogel by introducing it as a vapor or condensing it in the pores of the aerogel. No order of adding siloxane should be implied as it can occur at any point in the process between polymerization and finalizing the aerogel.

The embodiments of reducing the refractive index by post modification of the polymer gel or aerogel by fluorine, fluorine-containing chemical groups, or siloxane-containing chemical groups, are merely examples. Limitations of the embodiments to these examples is not intended and no such limitation should be implied. Other chemical bonds or functional groups may be used to reduce the refractive index of the gel or aerogel.

The embodiments enable production of porous polymer aerogels with increased optical transparency and decreased haze when compared to higher refractive index counterparts, without decreases in porosity. The aerogels resulting from these embodiments are particularly suitable in window thermal barrier applications. A wide range of low refractive index monomers and/or crosslinkers, for example with high oxygen or fluorine content, exist and can be easily copolymerized with rigid monomers and/or crosslinkers by controlled polymerization methods to fine tune the properties of the resultant porous transparent polymers. Low refractive index polymer aerogels, particularly those containing fluorine atoms, commonly have increased hydrophobicity, chemical resistance, and thermal stability, compared to their high refractive index counterparts. Hydrophobicity, chemical resistance, and thermal stability generally increase with fluorine content. Low refractive index monomers and/or crosslinkers are commonly composed of heavy atoms, such as oxygen and fluorine, which increase phonon scattering and decrease thermal conductivity, making these polymer aerogels particularly suitable as transparent thermal barriers. Due to a combination of intrinsically low thermal conductivity and lower haze at high porosity, aerogels made with low refractive index monomers can reach thermal conductivity values lower than 0.1 W/mK. Degradation onset temperature means the temperature at which 2% of the mass of a dried aerogel is lost.

Figure 4:
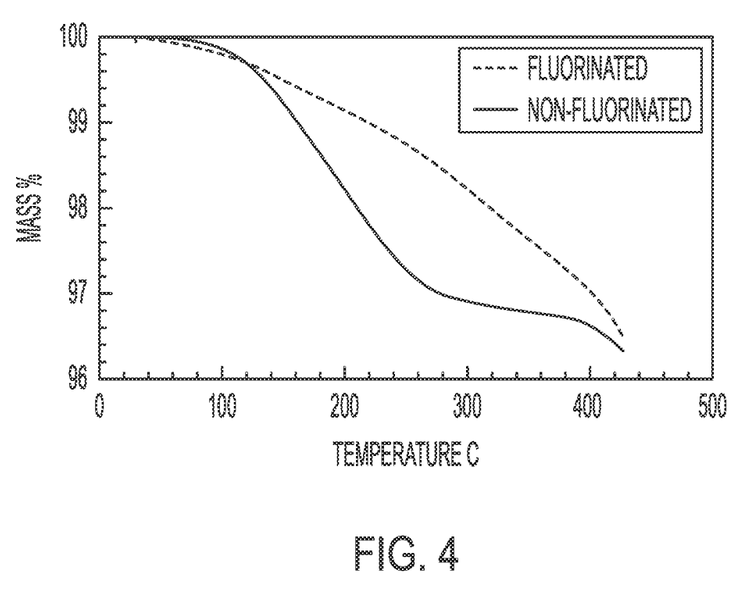
FIG. 4 shows a graph of thermal stability in terms of mass versus temperature.

FIG. 4 shows that an aerogel with 20 wt % fluorine content has higher thermal stability than an aerogel without fluorine, as measured by thermogravimetric analysis. A metric for thermal stability is the degradation onset temperature which means the temperature at which 2% of the mass is lost due to decomposition reactions. Degradation onset temperature is measured by heating the dried aerogel from 25° C. to a high temperature, such as 400° C., at a rate of 20° C./min, in an inert gas atmosphere, while simultaneously measuring the mass of the aerogel. Immediately prior to measurement, the dried aerogel is typically re-dried by heating to 50° C. for 5 minutes or a similar procedure. Heating at a rate of 20° C./min to a temperature higher than the degradation onset temperature would result in a mass loss of greater than 2%. Using a different heating rate may affect the measurement of degradation onset temperature. The degradation onset temperature is 318° C. for the fluorinated material and 210° C. for the non-fluorinated aerogel. The incorporation of low refractive index fluorinated monomers enables degradation temperatures greater than 250° C. to be achieved.

In this manner, the reduction in haze and increase in optical transparency of porous polymer occurs in aerogels by incorporation of low refractive index monomers when compared to their higher refractive index analogues is novel. The reduction in haze and increase in optical transparency of porous polymer aerogels by substitution of monomers and/or crosslinkers with their low refractive index analogues is possible by the embodiments here. The embodiments here also provide the ability to create highly porous polymer aerogels under supercritical drying conditions (porosity >40%) with low haze (<30%/3 mm) coupled with high specific surface area (>500 m$^2$/g). In addition, they provide the ability to create porous polymer aerogels under ambient drying conditions (porosity >40%) with low haze (<15%/3 mm) coupled with high specific surface area (>600 m$^2$/g), and to maintain transparency at large pore dimensions (<60 nm) in porous polymer aerogels synthesized using low refractive index monomers.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of producing a polymer aerogel, comprising:
dissolving precursors into a solvent, wherein the precursors include monomers, crosslinkers, a controlling agent and an initiator to form a precursor solution, wherein at least one of the monomers or at least one of the crosslinkers has a refractive index of 1.4 or lower;
polymerizing the precursor solution to form a gel polymer; and
removing the solvent from the gel polymer to produce the polymer aerogel.

2. The method of claim 1, wherein the precursors include at least one monomer or at least one crosslinker that has an elastic modulus of at least 3.5 GPa.

3. The method of claim 1, wherein the at least one monomer or the at least one crosslinker comprises one selected from the group consisting of: divinylbenzene; hexanediol diacrylate; hexanediol dimethacrylate, trimethacrylate adamantane, and dipentaerythritol pentacrylate.

4. The method of claim 1, wherein the at least one of the monomers or the at least one of the crosslinkers having a refractive index of 1.5 or lower comprises at least one selected from the group consisting of: 1H, 1H, 6H, 6H-Perfluoro-1,6-hexanediol diacrylate (FHDDA), 2, 3, 4, 5,6-pentafluorostyrene, 1H, 1H, 2H-Perfluoro-1-hexene, ethylene glycol diacrylate, 1,1,1,3,3,3-Hexafluoroisopropyl methacrylate, 2,2,2-Trifluoroethyl methacrylate, 1,1,1,3,3,3-Hexafluoroisopropyl acrylate, 2,2,2-Trifluoroethyl acrylate, methacrylate-functionalized perfluoropolyethers, and acrylate-functionalized perfluoropolyethers.

5. The method of claim 1, wherein the initiator comprises at least one selected from the group consisting of: a thermal initiator, AIBN, lauroyl peroxide, benzoyl peroxide, tert-butyl peroxide, dicumyl peroxide, a photoinitiator, benzophenone, anthraquinone, camphorquinone, and benzoin.

6. The method of claim 1, wherein the control agent comprises at least one selected from the group consisting of: a chain transfer agent, an organic thiol chain transfer agent, dodecanethiol, chloroform, octyl mercaptan, and 1,8-dimercapto-3,6-dioxaoctane.

7. The method of claim 1, wherein the control agent comprises at least one selected from the group consisting of: reagents to enable stable free radical polymerization, a stable nitroxide, an alkoxyamine, 2,2,6,6-Tetramethyl-1-piperidinyloxy (TEMPO), and 4-hydroxy-TEMPO, a reagent capable of mediating a RAFT polymerization, a trithiocarbonate chain transfer agent, a xanthate chain transfer agent, a benzodithioate chain transfer agent, and a ligand-coordinated transition metal ion capable of mediating an ATRP polymerization.

8. The method of claim 1, wherein the polymerizable precursors comprise 0.1-70 vol % of the precursor solution.

9. The method of claim 1, wherein the initiator comprises 0.001-10 wt % of the precursor solution.

10. The method of claim 1, wherein the control agent comprises 0.0001-10 wt % of the precursor solution.

11. The method of claim 1, wherein the at least one low refractive index monomer or the at least one crosslinkers comprise 0.1-70 vol % of the polymerizable precursors.

12. The method of claim 1, wherein monomers having an elastic modulus of at least 3.5 GPa and crosslinkers comprise 30-99.9 vol % of the polymerizable precursors.

13. The method of claim 1, wherein polymerizing comprises one of either heating the precursor solution to a temperature between 50 and 150° C. for a period of time of at least 1 min, or exposure to electromagnetic radiation.

14. The method of claim 1, further comprising drying the gel polymer by one of ambient drying, freeze drying, or supercritical CO2 drying.

15. A method of producing a polymer aerogel, comprising:
dissolving precursors into a solvent, wherein the precursors include monomers, crosslinkers, a controlling agent and an initiator to form a precursor solution, and the precursors include at least one monomer or at least one crosslinker that has an elastic modulus of at least 3.5 GPa;
polymerizing the precursor solution to form a gel polymer;
removing the solvent from the gel polymer to produce the polymer aerogel; and
reducing a refractive index of one of either the gel polymer or the polymer aerogel.

16. The method as claimed in claim 15, wherein reducing a refractive index of the polymer aerogel occurs after one of either removing the solvent or drying the polymer aerogel.

17. The method as claimed in claim 15, wherein reducing the refractive index comprises modifying the polymer gel or the polymer aerogel with one of fluorine, fluorine-containing chemical groups, or siloxane-containing chemical groups.

* * * * *